(12) United States Patent
Zirwas

(10) Patent No.: US 9,819,516 B2
(45) Date of Patent: Nov. 14, 2017

(54) CHANNEL ESTIMATION IN WIRELESS COMMUNICATIONS

(71) Applicant: NOKIA SOLUTIONS AND NETWORKS OY, Espoo (FI)

(72) Inventor: Wolfgang Zirwas, Munich (DE)

(73) Assignee: Nokia Solutions and Networks OY, Espoo (FI)

( * ) Notice: Subject to any disclaimer, the term of this patent is extended or adjusted under 35 U.S.C. 154(b) by 193 days.

(21) Appl. No.: 14/780,408

(22) PCT Filed: Mar. 28, 2013

(86) PCT No.: PCT/EP2013/056751
§ 371 (c)(1),
(2) Date: Sep. 25, 2015

(87) PCT Pub. No.: WO2014/154293
PCT Pub. Date: Oct. 2, 2014

(65) Prior Publication Data
US 2016/0043883 A1 Feb. 11, 2016

(51) Int. Cl.
*H04L 12/50* (2006.01)
*H04L 25/02* (2006.01)
(Continued)

(52) U.S. Cl.
CPC ....... *H04L 25/0206* (2013.01); *H04B 7/0408* (2013.01); *H04B 7/0617* (2013.01);
(Continued)

(58) Field of Classification Search
CPC .................................................. H04W 72/0406
(Continued)

(56) References Cited

U.S. PATENT DOCUMENTS

| 5,191,598 A | 3/1993 | Baeckstroem et al. |
| 6,144,652 A | 11/2000 | Avidor et al. |

(Continued)

FOREIGN PATENT DOCUMENTS

| EP | 0676870 A1 | 10/1995 |
| JP | 07283808 A | 10/1995 |

(Continued)

OTHER PUBLICATIONS

Office Action for Korean Application 10-2015-7031092, dated Mar. 30, 2017, 5 pages.

(Continued)

*Primary Examiner* — Dang Ton
(74) *Attorney, Agent, or Firm* — Brake Hughes Bellermann LLP

(57) ABSTRACT

Channel estimation where at least two sets of multipath components for a reception range are formed by applying spatial filtering to reference signal information measured by a communication device. Each set of multipath components comprises a number of multipath components that is less than the number of multipath components for the range. Separate parameter estimations are performed on the at least two sets of multipath components. The communication device may be a mobile device, and measurements may be provided by the mobile device in multiple of locations.

15 Claims, 10 Drawing Sheets

(51) Int. Cl.
   *H04B 7/0408*   (2017.01)
   *H04B 7/08*     (2006.01)
   *H04L 25/03*    (2006.01)
   *H04B 7/06*     (2006.01)

(52) U.S. Cl.
   CPC ....... *H04B 7/0834* (2013.01); *H04L 25/0204* (2013.01); *H04L 25/0212* (2013.01); *H04L 25/0224* (2013.01); *H04L 25/0248* (2013.01); *H04L 25/03891* (2013.01)

(58) Field of Classification Search
   USPC ........................................................ 370/329
   See application file for complete search history.

(56) References Cited

U.S. PATENT DOCUMENTS

2006/0285531 A1   12/2006   Howard et al.
2009/0207077 A1   8/2009    Hwang et al.
2016/0277132 A1*  9/2016    Pratt .................... H04B 17/373

FOREIGN PATENT DOCUMENTS

| JP | 10155180 A | 6/1998 |
| JP | 2002280943 A | 9/2002 |
| KR | 1020080016967 A | 2/2008 |
| KR | 1020090088193 A | 8/2009 |

OTHER PUBLICATIONS

International Search Report and Written Opinion for International Application No. PCT/EP2013/056751, dated Nov. 14, 2013, 7 pages.

Office Action with English translation for Japanese Application 2016-504502, dated Oct. 31, 2016, 9 pages.

* cited by examiner

CHANNEL ESTIMATION IN WIRELESS COMMUNICATIONS

This application is a national stage entry of PCT Application No. PCT/EP2013/056751, filed on Mar. 28, 2013, entitled "CHANNEL ESTIMATION IN WIRELESS COMMUNICATIONS" which is hereby incorporated by reference in its entirety.

This disclosure relates to channel estimation in wireless communications.

A wireless communication system can be seen as a facility that enables communication sessions between two or more nodes such as fixed or mobile devices capable of wireless communications, access nodes such as base stations, relays, machine type devices, servers and so on. Examples of wireless systems include public land mobile networks (PLMN) such as cellular networks, satellite based communication systems and different wireless local networks, for example wireless local area networks (WLAN). A communication system and compatible communicating entities typically operate in accordance with a given standard or specification which sets out what the various entities associated with the system are permitted to do and how that should be achieved. For example, the standards, specifications and related protocols can define the manner how various entities shall communicate, how various aspects of the communications shall be implemented and how different entities involved in communications shall be configured.

A user can access the communication system via a base station or another access node by means of an appropriate communication device. A communication device of a user is often referred to as user equipment (UE) or terminal. A communication device is provided with an appropriate signal receiving and transmitting arrangement for enabling communications with other nodes such as a base station or another communication device. In certain systems the base station is referred to as Node B (NB) or enhanced NodeB (eNB).

A communication device may communicate simultaneously on a multiple of radio channel components. An example of such arrangements is carrier aggregation (CA) where component carriers provide an aggregated carrier. Coordinated multipoint transmission (CoMP) is an example of a technique where combined results of reception by a plurality of stations from a source device or reception of signals from a plurality of sources can be utilised. Joint transmission over several radio stations can be seen as a network based multiple input multiple output (MIMO) arrangement.

Channel state information (CSI) is an example of information that is used in wireless systems. CSI is typically used for defining properties of a communication channel to describe how a signal propagates from a transmitter to a receiver. CSI represents the combined effect of, for example, scattering, fading, and power decay with distance. CSI makes it possible to adapt transmissions to current channel conditions and can be advantageously utilised e.g. for achieving reliable communication with high data rates. This can be provided e.g. in multi-antenna systems.

At least some parts of channel state information may need to be based on an estimate. This may be so e.g. because the channel conditions vary and so instantaneous CSI needs to be estimated on a short-term basis. A common approach for channel estimation is to use so-called training or pilot sequences or reference signals (RS) where known sequences or signals are transmitted and the CSI is estimated at the receiver based on these pilot signals. The estimation can be quantized and fed back to the transmitter. It is also possible that the receiver simply returns measurement results to the transmitter. Reverse-link estimation is also known. On the other hand, for example for frequency division duplex (FDD) systems the CSI reporting should cause only a low to moderate feedback overhead. Channel estimation can thus be understood as measuring and estimating the channel based on e.g. pilot signals. Channel prediction is a procedure using these estimates to predict the channel in future.

As precise as possible channel state information (CSI) is desired in various applications. For example, coordinated multipoint transmission and other systems where multiple channel components are involved, for example for multiple input multiple output (MIMO) based systems, would benefit from as accurate as possible CSI. So called massive multiple input multiple output (MIMO) antenna systems with potentially several dozens of antenna elements are also under research, and these should also be provided with as accurate as possible CSI. Another example of recent development is the so called interference mitigation framework, IMF-A. Interference mitigation framework (IMF-A) can rely, beside other techniques, on joint transmission cooperative multi-point transmission (JT CoMP) and is expected to provide significant performance gains in suitable scenarios. Under the assumption of ideal channel knowledge and high signal to noise ratios (SNR) large spectral efficiencies of up to six or even seven bit/s/Hz/cell are believed to be achievable. The gain can be achieved either for ideal channel estimation and prediction or for very low user mobility. A powerful channel estimation, prediction and reporting technique is of interest to achieve these gains also for higher mobility and with high robustness. Downlink (DL) precoding solutions also require, or at least benefit, from channel prediction to allow also for moderate user equipment (UE) mobility.

Various concepts have been used for channel estimation and prediction. For example, autoregressive models like Wiener- and Kalman filtering have been used. These optimally exploit channel correlations in time and frequency, i.e., of the corresponding covariance matrix $R \cdot \mathbb{C}^{M_t \times M_f}$ with $M_t$ and $M_f$ being the number of samples in the time- and the frequency domain.

A physical approach tries to model the radio channel as a number of multipath components (MPC) as the result of the physical propagation of planar electromagnetic waves between transmitter and receiver stations. The model based channel estimation concept can provide, under the assumption of a perfect building vector data model (BVDM), a long reaching channel prediction with extremely low feedback overhead. The modeling include modeling of reflection, transmission, and diffraction processes at buildings and objects of the environment. A proper prediction requires an accurate estimation of all relevant parameters like amplitude, phase, time delay, Doppler frequency, angle of arrival, and angle of departure of all relevant MPCs.

For estimation of the parameters algorithms like the space-alternating generalized expectation maximization (SAGE) or estimation of signal parameters via rotational invariance techniques (ESPRIT) might be used. It can be used to replace the per physical resource block (PRB) reporting of the channel transfer function (CTF) by a feedback of the three-dimensional device location with respect to a known model, the BVDM, of the eNB surrounding. This enables the eNB to reconstruct the wideband radio channel for one or even several channel components, thereby achieving feedback reduction. In reality model errors of the BVDM require an additional estimation of model parameters like the amplitude, phase or delay of multi path components based on conventional channel state information (CSI) measurements relying on CSI reference signals (CSI RS).

Parameter estimation methods like the SAGE algorithm suffer from a high number of unresolvable, sometimes called unobservable, parameters. According to ray tracing simulations more than K=200 relevant MPCs have to be estimated to achieve a normalized mean square error (NMSE) better than −20 dB for the estimated $CTF^{h(f,t)}$. For a 20 MHz LTE system these 200 MPCs are distributed over about 40 relevant taps of the channel impulse response (CIR), i.e., per tap there are about five to ten unobservable MPCs.

As accurate as possible channel estimation and prediction would nevertheless be useful e.g. in applications for joint transmission such as CoMP, MIMO, beamforming or other techniques relying on accurate information regarding several radio channel components. A challenge for e.g. joint (JT) CoMP is that channel estimation is needed for many channel components with high accuracy. For example, in $3^{rd}$ Generation Partnership Project (3GPP) Long Term Evolution (LTE) based systems CSI reference symbols (CSI-RS) for channel sounding are sent per component carrier with a maximum bandwidth of 20 MHz. For a typical measurement bandwidth of e.g. 20 MHz each tap of the channel impulse response (CIR) contains 10 to more multipath components (MPC) making an accurate estimation of the hidden parameters (phase, amplitude, delay, etc.) of these MPCs difficult or even impossible. This is a challenge also e.g. for the quite common space alternating generalized expectation maximization (SAGE) algorithm, which tries to estimate iteratively the parameters for a limited number of MPCs. The number of MPCs has to be limited to a few as otherwise the computations become too complex. It has been found that for achieving a normalized mean square error (NMSE) of less than −20 dB for the estimation (or similarly the prediction) about 200 or more MPCs will have to be estimated accurately. This is far beyond the ten MPCs which is considered the typical feasibility range for the SAGE algorithm.

Model based channel prediction (MBCP) has quite some similarities to the SAGE algorithm in the sense that it also tries to provide the parameters of all MPCs. Due to inaccuracies of the BVDM model MBCP has to be tightly combined with SAGE like channel estimation and prediction techniques and will therefore suffer similarly from the shortcomings of the SAGE algorithm.

All algorithms are known to have, with some dependency on the channel characteristics, a limited prediction horizon of some tenth of a wavelength of the Local oscillator (LO) RF frequency.

Embodiments of the invention aim to address one or several of the above issues.

In accordance with an aspect there is provided a method for channel estimation comprising forming at least two sets of multipath components for a reception range by applying spatial filtering to reference signal information measured by a communication device, wherein each set of multipath components comprises a number of multipath components that is less than the number of multipath components for the range, and performing separate parameter estimations on the at least two sets of multipath components.

According to another aspect there is provided apparatus for channel estimation, the apparatus comprising at least one processor, and at least one memory including computer program code, wherein the at least one memory and the computer program code are configured to, with the at least one processor, cause the apparatus at least to form at least two sets of multipath components for a reception range by applying spatial filtering to reference signal information measured by a communication device, wherein each set of multipath components comprises a number of multipath components that is less than the number of multipath components for the range, and perform separate parameter estimations on the at least two sets of multipath components.

In accordance with a more specific aspect the communication device comprises a mobile device.

A virtual multi-antenna array can be provided by a mobile device performing a first measurement in a first location and at least one second measurement in at least one second location.

A first set of multipath components can be formed by a first directed beamformer and at least one second set of multipath components can be formed by at least one second directed beamformer.

The spatial filtering can be applied to rotate a reception beam over a 360 degrees range.

The results of the separate parameter estimations can be combined to produce channel state information for the communication device.

The forming of the at least two sets of multipath components and separate parameter estimations may be performed at the communication device and/or at least in part at a network element.

Switching between different modes of channel estimation may be provided based on the velocity of a mobile device. Switching may be to or from a mode where the range is divided into subranges by the spatial filtering based on a velocity threshold. Mobility information for the mode switching may be generated by a positioning functionality of the mobile device.

Information may be exchanged between a communication device and a network entity concerning the manner channel state information is produced.

In accordance with an aspect notch filtering may be applied to multipath components. A full channel impulse response may be compared with a channel impulse response where the strongest multipath component has been notched out and at least one parameter may be estimated based on the comparison. The at least one parameter may comprise at least one of angle of arrival of the multipath component, incident amplitude, incident phase and path delay.

A network element, for example an eNB or another controller of a base station, a radio access system or a communication device, for example a mobile station can be configured to operate in accordance with the various embodiments.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system capable for communications with mobile communication devices over a multiple of carriers. Before explaining in detail the exemplifying embodiments, certain general principles of a wireless communication system, access systems thereof, mobile communication devices and inter cell cooperation are briefly explained with reference to FIGS. 1 to 3 to assist in understanding the technology underlying the herein described examples.

Figure 1:
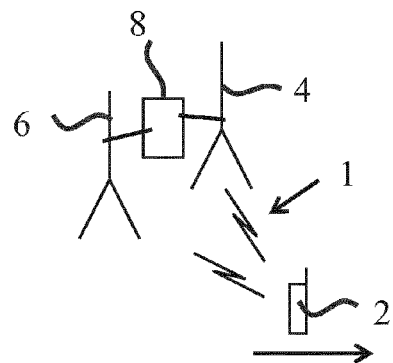
FIG. 1 shows a schematic diagram of inter cell cooperation according to some embodiments.

A mobile communication device 2 is typically provided wireless access via antenna arrangement of at least one base station or similar wireless transmitter and/or receiver node of an access system. In FIG. 1 two antennas, for example antennas of two base stations 4 and 6 are shown. Each communication device and base station may communicate over one or more radio channels and may send signals to and/or receive signals from more than one source. The mobile device 2 can move relative to the antenna elements, as depicted by the arrow.

Mobile device 2 and base stations 4 and 6 might receive/provide multiple channel components (CC). The channel components may be provided over a Multiple Input/Multiple Output (MIMO) antenna system. MIMO arrangements as such are known. MIMO systems use multiple antennas at the transmitter and receiver along with advanced digital signal processing to improve link quality and capacity. For spatial multiplexing the throughput increases with the number of antenna elements.

A non-limiting example of the recent developments in communication system architectures is the long-term evolution (LTE) of the Universal Mobile Telecommunications System (UMTS) that is being standardized by the 3rd Generation Partnership Project (3GPP). Further development of the LTE is referred to as LTE-Advanced. Yet further developments such as 'beyond 4G' have also been considered. The LTE employs a mobile architecture known as the Evolved Universal Terrestrial Radio Access Network (E-UTRAN). Base stations or base station systems of such architectures are known as evolved or enhanced Node Bs (eNBs). An eNB may provide E-UTRAN features for cells such as user plane Radio Link Control/Medium Access Control/Physical layer protocols (RLC/MAC/PHY) and control plane Radio Resource Control (RRC) protocol terminations towards the communication devices. Other examples of radio access include those provided by base stations of systems that are based on technologies such as wireless local area network (WLAN) and/or WiMax (Worldwide Interoperability for Microwave Access).

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments at least a part of control apparatus may be respectively provided in each base station. FIG. 1 shows a network element 8 providing control on transmitting element 4 and 6. The element can provide a coordinating function described in more detail later for example based on appropriate self-organising network (SON) processes, by means of an eNB or a central control unit of a CoMP cooperation area.

Figure 2:
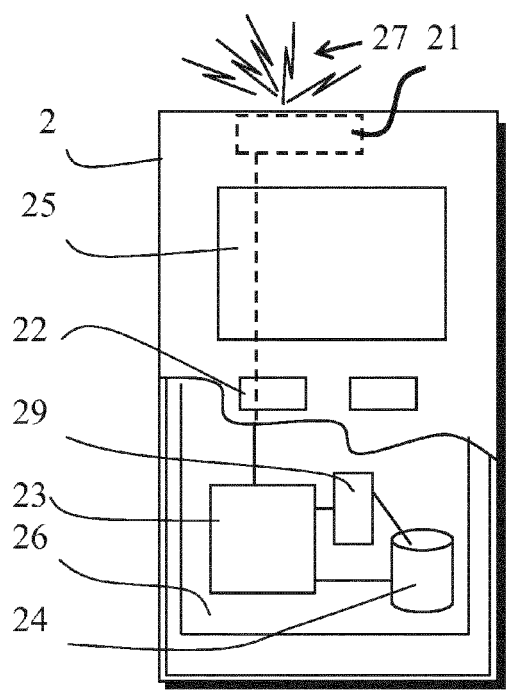
FIG. 2 shows a schematic diagram of a mobile communication device according to some embodiments.

A possible mobile communication device for communication over a plurality of channel components (CCs) will now be described in more detail with reference to FIG. 2 showing a schematic, partially sectioned view of a communication device 2. Such a communication device is often referred to as user equipment (UE) or terminal. An appropriate mobile communication device may be provided by any device capable of sending radio signals to and/or receiving radio signals on multiple of channel components. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device may receive signals 27 from multiple of sources over an air interface via appropriate apparatus for receiving and may transmit signals via appropriate apparatus for transmitting radio signals. In FIG. 2 transceiver apparatus is designated schematically by block 21. The transceiver apparatus 21 may be provided for example by means of a radio part and associated antenna arrangement. The antenna arrangement may be arranged internally or externally to the mobile device.

A mobile communication device is also provided with at least one data processing entity 23, at least one memory 24 and other possible components 29 for use in software and hardware aided execution of tasks it is designed to perform, including control of access to and communications with base station systems and other communication devices. The data processing, storage and other relevant control apparatus can be provided on an appropriate circuit board and/or in chipsets. This feature is denoted by reference 26.

The user may control the operation of the mobile device by means of a suitable user interface such as key pad 22, voice commands, touch sensitive screen or pad, combinations thereof or the like. A display 25, a speaker and a microphone can be also provided. Furthermore, a mobile communication device may comprise appropriate connectors (either wired or wireless) to other devices and/or for connecting external accessories, for example hands-free equipment, thereto.

Figure 3:
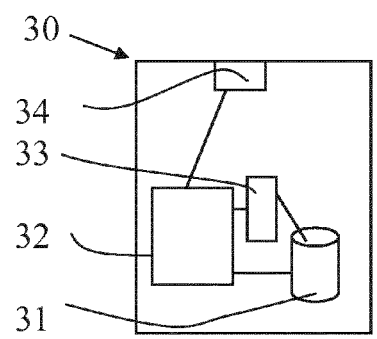
FIG. 3 shows a control apparatus according to some embodiments.

FIG. 3 shows an example of a control apparatus for a communication system, for example to be coupled to and/or for controlling one or more stations providing cells. It is noted that in some embodiments each base station comprises a separate control apparatus that may communicate control data with each other. The control apparatus 30 can be arranged to provide control on communications in the service area of the system. The control apparatus 30 can be configured to provide control functions in association with producing channel station information for mobile devices by means of data processing facility in accordance with certain embodiments described below. For this purpose the control apparatus comprises at least one memory 31, at least one data processing unit 32, 33 and an input/output interface 34. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling reception of sufficient information for decoding of received information blocks.

The following describes certain exemplifying embodiments where an accurate channel estimation or prediction and channel state information is provided. A challenge for e.g. JT CoMP is that the channel estimation is needed for many channel components with high accuracy. In certain embodiments the SAGE like estimation of the hidden MPCs is divided into tractable sub-problems to minimize the number of MPCs per sub-problem. In accordance with an example virtual beamforming is applied on a set of subsequent measurements. Beamforming, or spatial filtering, provides transmission or reception of signals preferentially in some directions over others. This can be achieved by combining elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is known as the receive/transmit gain.

Figure 4:
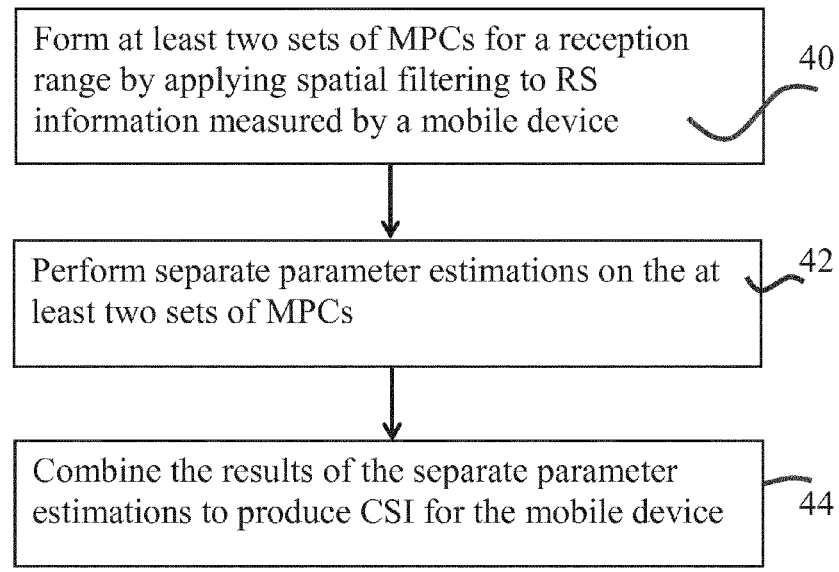
FIG. 4 shows a flowchart according to a certain embodiment.

Flowchart of FIG. 4 shows a method for channel estimation aiming to provide more accurate channel state information. In the method at least two sets of multipath components for a reception range are formed at 40 by applying spatial filtering to reference signal information measured by a mobile device. Each set of multipath components comprises a number of multipath components that is less than is the number of multipath components for the reception range. Separate parameter estimations are then performed at 42 on the at least two sets of multipath components.

In accordance with an embodiment the results of the separate parameter estimations are combined at 44 to produce channel state information for the mobile device. However, combining of the results may not be required in forms of using the separate parameters estimations.

In accordance with a possibility the mobile device performs a first measurement in a first location and at least one second measurement in at least one second location to provide a virtual multi-antenna array. The relevant sets of MPCs are provided based on the beamformer directions. Beamformers in the different directions can be formed by applying different Rx weights over all measurement locations.

A first set of multipath components is formed based on the first measurement in the first location and at least one second set of multipath components based on the at least one second measurement in the at least one second location. An example of such virtual beamforming approach is illustrated in FIG. 5.

Figure 5:
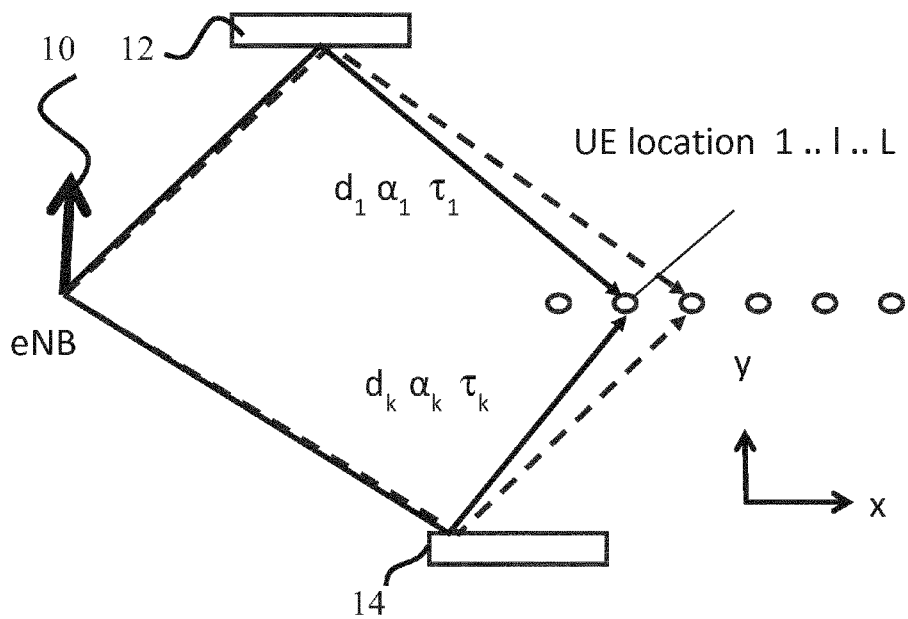
FIG. 5 shows en example of generation of virtual antenna array by moving a mobile device over a plurality of locations.

In the example of FIG. 5 an assumption is made that the mobile device, in this example an UE, moves on a straight line relative to a base station, in this example eNB 10, with a certain moderate speed. Signals transmitted by the eNB are reflected by object 12 and 14. Since the UE moves relative to the eNB 10 and the objects 12 and 14, the angle of arrival (AoA) of the reflected signals will be different in different locations.

The UE performs e.g. every 10 ms an accurate CSI measurement. The successive measurement locations are denoted by dots 1 to L. The UE stores all N measurement results in the memory thereof for evaluation. For stationary channel conditions the different measurement locations 1 to L can be seen as virtual antennas of a MIMO antenna array. A benefit is that there is no mutual coupling between such antennas.

Appropriate beamformers are provided as a result of Rx processing over locations 1 to x, e.g. 1 to 24. By using different Rx filters the beamformers over the location 1 to x will have different beam directions. This allows scanning of the whole 360° around the UE by a limited number of parallel processed beamformers.

By applying suitable precoding weights on the virtual antenna array large beamforming gains may be obtained. For parameter estimation a benefit is that reduction of MPCs can be achieved compared to those having their last interaction point in the direction of the virtual antenna boresight. Antenna boresight is understood as the axis of maximum gain, or maximum radiated power, of a directional antenna. For most antennas the boresight is the axis of symmetry of the antenna. The boresight axis can be fixed by the shape of the antenna. However, e.g. phased array antennas can electronically steer the beam, thus changing the angle of the boresight.

With a 10 ms CSI RS period within e.g. 300 ms overall measurement time N would capture 30 measurements. With N=30 a beamforming gain of $10*\log_{10}(30)$ equal to about 14 dB may be obtained (calculated by adding up 30 signals constructively versus adding 30 noise signals randomly). This improves the signal to noise ratio (SNR) accordingly beside the reduction of MPCs per tap. Also typically unpredictable diffuse scatterers can be suppressed accordingly by 14 dB (for 30 locations).

The beamwidth of a virtual beamformer depends on the distance a UE has moved during the measurement time. For very low mobility e.g. below 0.1 m/s and wavelengths λ of about 10 cm (RF=2.6 GHz) the beamwidth can be relatively broad as the UE moves within 300 ms only by 3 cm, i.e. a fraction of the wavelength λ. For a UE speed of about 1 m/s the beamwidth is considered to be suitable with about 10 degrees. For UE speeds above 10 m/s the UE will move by 3 m within 300 ms. In these circumstances the channel might not be stationary enough in all occasions. Switching between different estimation modes may be provided so that the estimation functionality is optimised based on the velocity of the UE. A detailed example of this will be explained later.

The apparatus processing the measurement results can be adapted to vary the spatial filtering so that the beam is rotated stepwise over 360 degree. i.e. a full circle range.

The processing, or at least a part thereof may be provided at the UE, eNB or another network element The UE can use appropriate combining functions to reconstruct the full CSI information from the set of beamformed parameter estimates. The UE can rotate the beam and combine the MPCs estimated for each beam direction.

The UE can be configured to report to the network a predicted CSI based on the reconstructed full CSI information.

The virtual beamforming based estimation utilising movement of the mobile device can perform differently for different velocities of the mobile device. It is considered to work best for moderate velocities. To take into account the different velocities the CSI processing and reporting scheme can be adapted to different mobility categories, and switching between the different schemes may be provided. In accordance with an example three different modes are provided.

a) very low mobility: Conventional Wiener or Kalman filtering approaches are used. These can be used as for an almost stationary UE there is no beamforming gain but benefits are obtainable from noise reduction effects. Parameter estimation of MPCs is not required, as the channel is relatively stable.

b) moderate mobility: the above discussed virtual beamforming provides good gains.

c) high speed: In this mode predictor antennas can be applied. As high speed is mostly related to moving cars, buses, trains etc., there is a good opportunity to attach such predictor antennas. Predictor antennas work best at high speed as it leads to the smallest gaps between to predictor antenna locations. In this arrangement number of antennas in a straight line can be provided e.g. on a train. The first antenna is used for channel estimation and reporting. While the train moves the next antenna comes to the same location with same channel conditions a little bit later and MIMO precoding can be done exactly for this time instant with the CSI of the predictor antenna.

New messages may need to be defined so that eNBs and UEs can be made aware of the applied prediction mode. The eNB can transmit for certain amount of time accurate CSI RSs allowing to capture all virtual antenna elements. Mode switching between low and high mobility UEs may need to be agreed on. For example the eNB may need to know the UE capability to switch on predictor antennas. The eNB should know the UE mobility, e.g. from reports derived from UE navigation tools.

The UEs can apply virtual beamforming and other processing at the UE side for parameter estimation of MPCs. The overall processing of the measurement result can be provided at the UE. Alternatively, UEs can report their measurements to the network and the overall processing is done at eNB side. A benefit of this is a reduced UE complexity. This would mean, on the other hand, an increased reporting overhead. Some or all of the processing might be shifted to the eNB by direct reporting of the e.g. 30 strongest taps of the measured CIR for e.g. 40 to 50 or any other agreed number of locations, which should fit to the mobile speed as well as the RF wavelength and the prediction horizon. The eNB can, after suitable processing, signal the UE the accurate parameters, which may use these as input for a low processing effort tracking mode. That way some kbit/s UL reporting seems feasible which is just a small fraction of the UL data rate of 100 Mbit/s or more for future UEs.

In case the eNB is doing the post processing the meaning of the reported CSI information shall be agreed on.

Figure 6A:
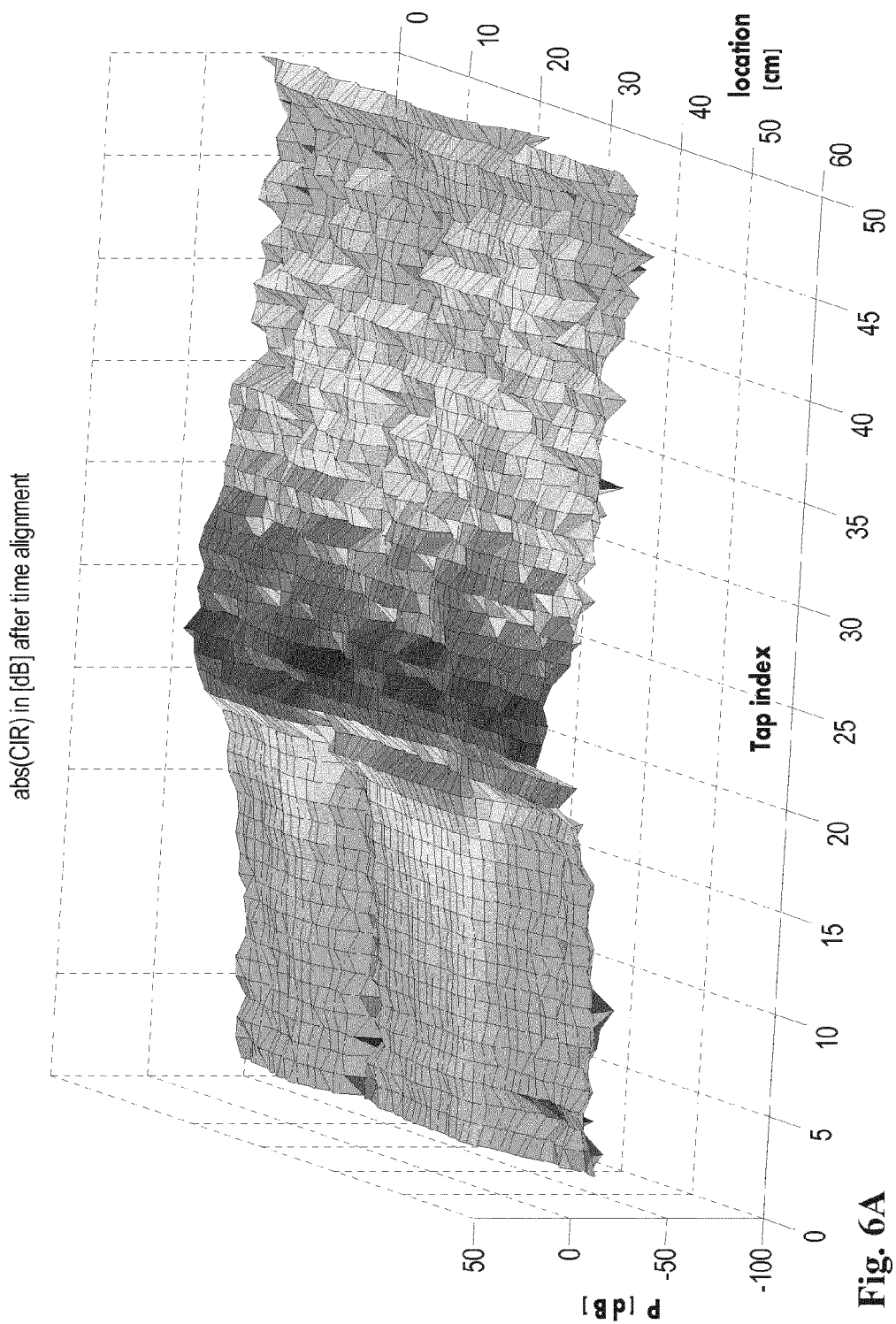
FIGS. 6A and 6B show comparison of original and beamformed CIR for a measured channel.
Figure 6B:
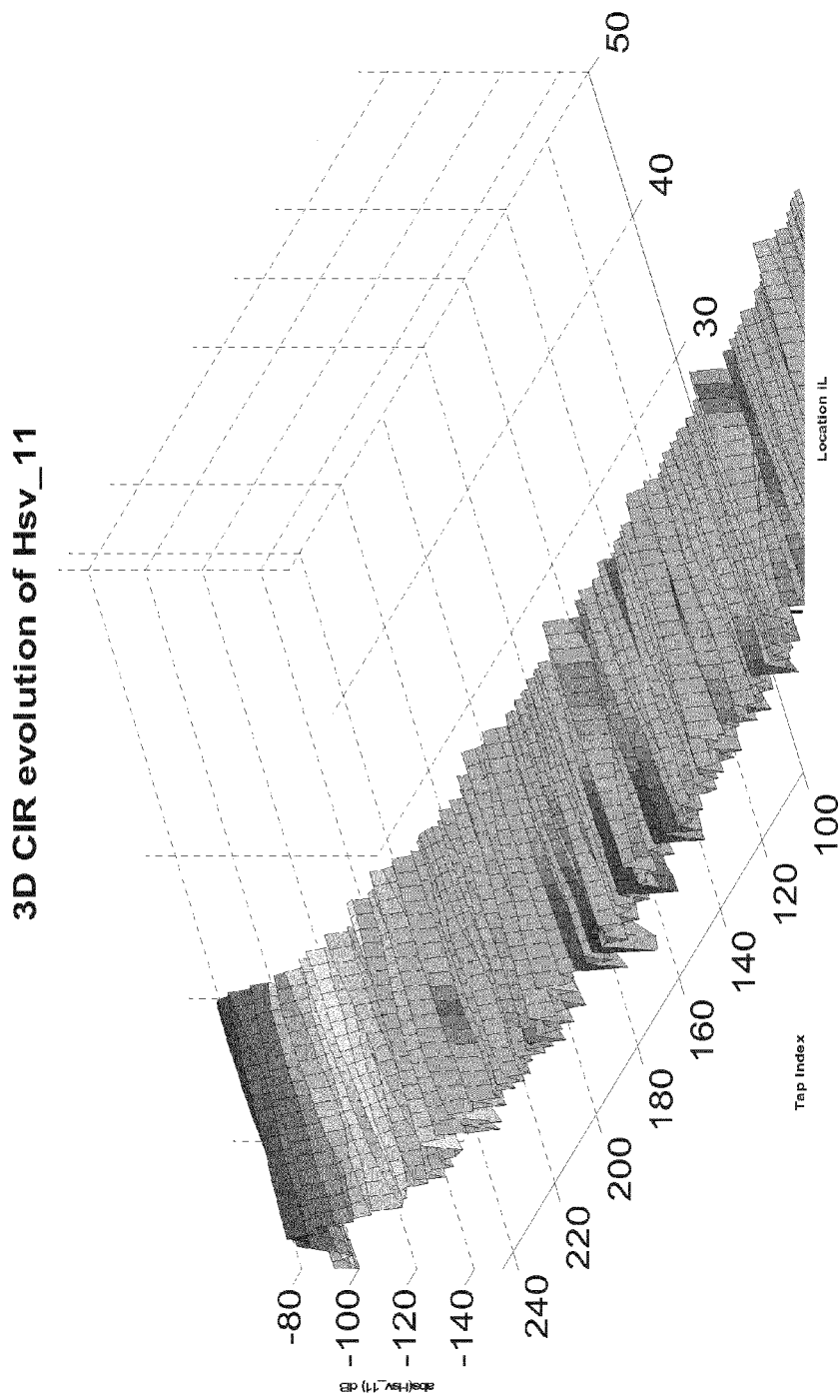
Figure 7:
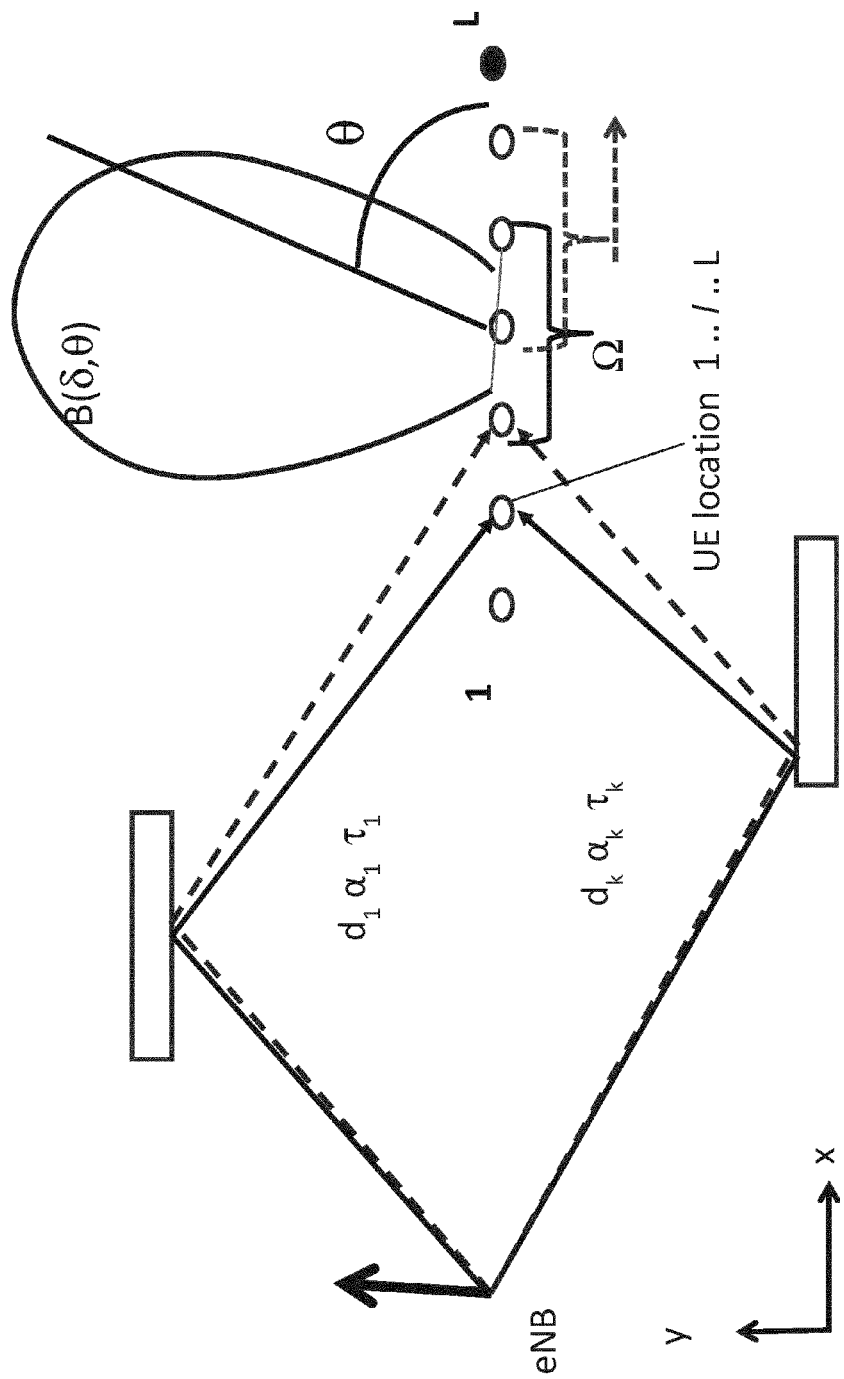
FIG. 7 shows an example of parameters of a single link radio channel and a virtual beam formed over adjacent measurements.

The following presents a detailed example for virtual beamforming. FIGS. 6A and 6B illustrate measured CIR H over the L=50 locations l=1 . . . L for original (FIG. 6A) and virtually beamformed (FIG. 6B) CIR for a measured outdoor channel. For virtual beamforming, the Rx signals of $\Omega \in \mathbb{C}$ adjacent locations are combined (see FIG. 7) to calculate the virtually beamformed vectors $h_l=H(1 \ldots Q, l \ldots l+\Omega-1)w \in \mathbb{C}^{\Omega \times 1}$ for l=1 . . . L−Ω+1, where each $h_l$ is shifted one location from left to right. Here, w is the weighting vector $w=[w_1, \ldots w_\omega, \ldots, w_\Omega]^T \in \mathbb{C}^{\Omega \times 1}$. All $h_l$ are combined into one matrix $H_B = \{h_l\}_{l=1 \ldots L-\Omega+1} \in \mathbb{C}^{Q \times L-\Omega+1}$. The complex weights of w can be chosen according to the relative distance $d_r=[L(l)-L(l-1)]/\lambda$ between two adjacent measurement locations, the number of virtual antenna elements Ω, and the intended design criterion. For example, w can be a unitary vector with elements $w_\omega(\delta)=e^{j\delta*\omega}$, where δ is a fixed phase shift between adjacent locations. The complex valued virtual beam pattern B(δ,θ) for a given δ over the azimuth angle $\theta \in [-\pi \ldots +\pi]$ is calculated as the far field superposition in the direction of θ of all virtual antenna elements transmitting a $1_{1 \times \Omega}$ vector. B(δ,θ) can be derived accurately as there is no mutual coupling which is typical for physical antennas. Note that the resulting boresight angle $\theta_{bore}$ of the virtual beam pattern with respect to the moving vector m(t) will be generally different from δ. The phases and amplitudes of the weights $w_\omega$ can be optimized for different design criteria, e.g., minimum sidelobe level, which has to be paid by a broader 3 dB beamwidth $\theta_{3\,dB}$. Generally $\theta_{3\,dB}$ is related to the overall length of the virtual array Ω*Δl versus the wavelength λ. For Ω=32 virtual antennas, $d_r=\Delta l/\lambda=0.08$, and a unitary beamformer w, the beamwidth $\theta_{3\,dB}$ is approximately 10°.

A benefit of the proposed concept is reduction of the number of MPCs per tap. $H_B$ consists mainly of those MPCs having their last interaction point in the direction $\theta_{bore}(\theta)$ of the virtual beamformer. Note that in here a virtual uniform linear array (ULA) is formed that generates a symmetric beampattern on the left and right side of the UE. Furthermore, the beamforming gain leads to a corresponding noise reduction as well as a reduction of the channel fluctuations or other measurement artifacts. The gain may be up to 15 dB for Ω=32.

The full estimated CIR $\hat{H}$ is reconstructed including all MPCs. Therefore, the beamformer is rotated over 180 degrees using a step size on the same order as the beamwidth $\theta_{3\,dB}$ to collect all MPCs from all directions, leading to the following high level algorithm:

a) apply to H the virtual beamformers $B_i=B(\delta_i)$ with $\delta_i=b_i*\Delta\delta$ and Δδ chosen so that $\{\theta_{bore}(\delta_i)/\theta_{3\,dB}\}=\{-0.5\pi/\theta_{3\,dB} \ldots +0.5\pi/\theta_{3\,dB}\} \in \mathbb{C}$. Estimate the parameters $\{\alpha_i, \tau_i, \Delta\tau_i\}$ of strongest MPCs in beam $B_i$ within the power window $P_{max,i}-TH_{MPC}$.

b) reconstruct and estimate the overall channel matrix $\hat{H}$ by a suitable function or algorithm $F(\{\alpha_i, \tau_i, \Delta\tau_i\})_{\{Bi\}}$ taking all parameter sets for all beam directions into account.

A virtual beamformer over Ω=32 locations was applied to the measured H according to forming $H_B$ for B(δ$_i$=0°). $H_B$ is estimated for L−Ω=50−32=18 locations corresponding to a length of 1.5λ, and so one could, for example, perform a parameter estimation over ~1λ and a prediction for ~0.5λ. A significant improvement was observed with a continuous evolution of the taps instead of the diffuse scattering of H when virtual beamforming was not applied. This facilitates a much more precise prediction. The outdoor LTE measurements at 2.6 GHz with and without virtual beamforming indicated a strong smoothing effect of the virtual beamformer making parameter estimation possible even in harsh environments.

A mobility adaptation functions seems also to be favorable. For very low speed UEs $d_r=\Delta l/\lambda$ will be very small and the corresponding $\theta_{3\,dB}$ beamwidth very broad for reasonable observations times. Here, the long correlation time is in favor of Kalman filtering. Medium mobility was found to be best covered by virtual beamforming, while very fast UEs may beneficially use predictor antennas or the like.

Figure 8:
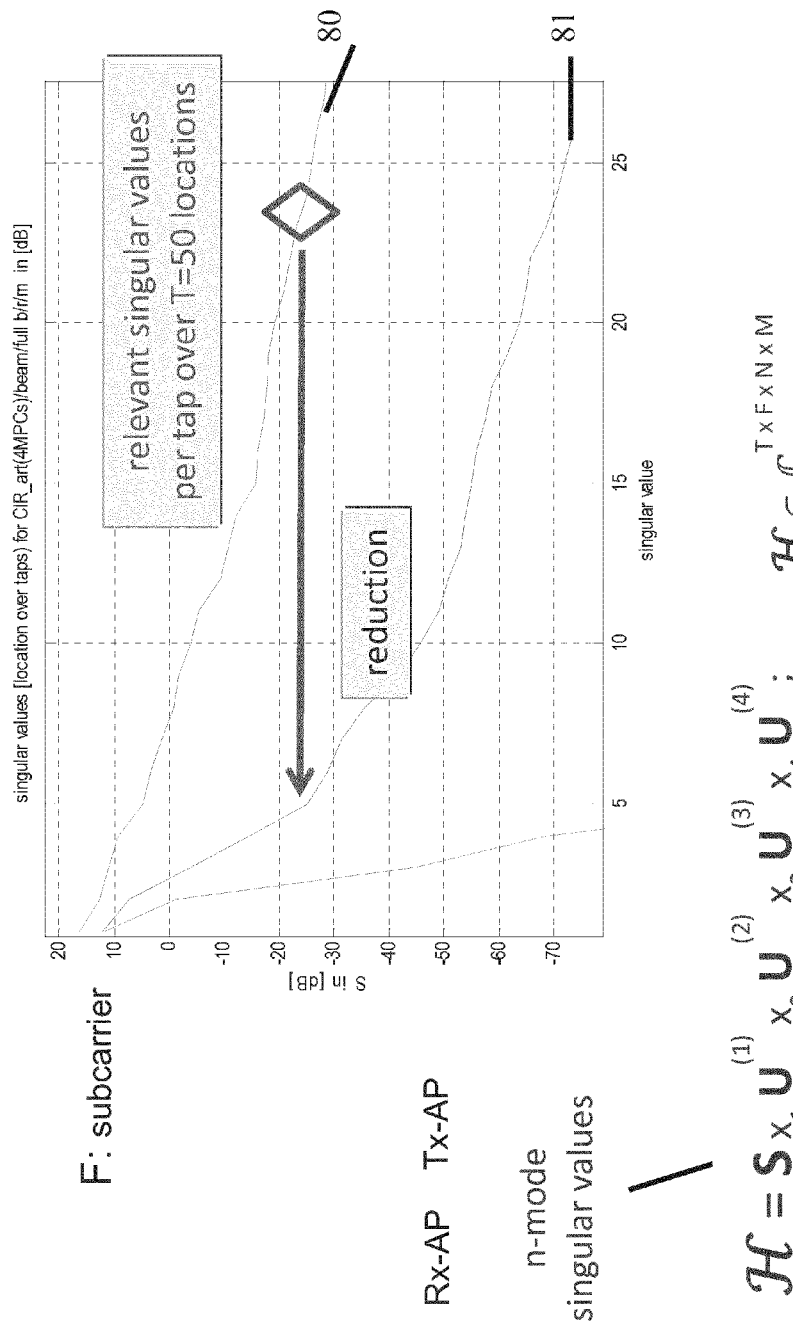
FIGS. 8 to 11 show test results in accordance with certain embodiments.

In FIG. 8 a higher order singular value decomposition (HOSVD) has been performed for a measured 2×2 MIMO link with and without the virtual beamforming. Comparing line 80 without virtual beamfomimg and line 81 with virtual beamforming a noticeable reduction of relevant singular values can be observed. As the singular values are closely related to the relevant multi path components one can expect quite an improvement for the parameter estimation.

Figure 9:
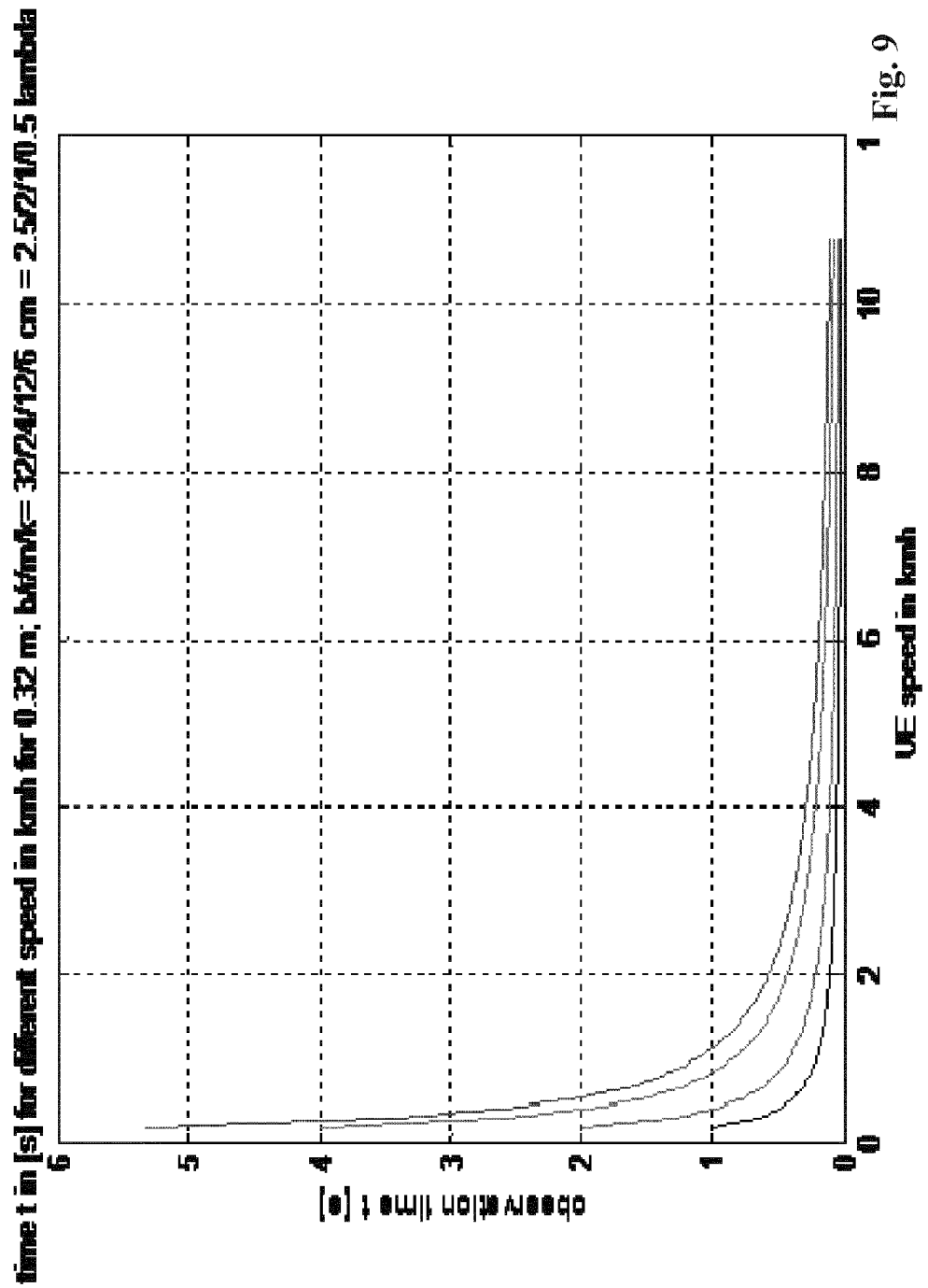

FIG. 9 illustrates the effects of different parameters which can be used as a first selection of a switching point between Wiener filtering and parameter estimation based algorithms. The x-axis is the mobile speed in km/h and the y-axis the time it takes to move over a distance. Four graphs for movement over a distance of 2.5, 2, 1 or 0.5 lambda are shown, the top most being for 2.5 and the lowest for 0.5 lambda. For good beamforming gains one might need at least one or two lambda. In addition the overall CSI estimation time should be below a few 100 µs. Therefore below a UE speed of 2 km/h being about 0.6 m/s it may become difficult to achieve significant beamforming gains, and another method might be preferred in some applications. The UE may also move so fast that the channel conditions are no longer stable over the number of virtual beamforming locations. The estimation may be switched to the next mode in an example scenario for CSI estimation in every 10 ms at around 30 kmh, or about 8.5 m/s.

In accordance with an aspect notch filtering is applied to measurements by the mobile device. The overall parameter space for a beamformed channel impulse response (CIR) can still be very high in certain applications, as there can be about 10-20 relevant taps with about one to three multipath components (MPC) each. Each MPC is typically represented by at least three values, i.e. the delay $\tau$, the slope of $\tau$ over the locations i_loc and its amplitude. Without a good pre-knowledge leading to some start parameter for the final optimization the search space may become infinitively large.

For a beamformer over 24 locations the 3 dB beam width is in the order of 30°. Conversely notches of typical beamforming patterns can be significantly narrower and might be as narrow as 1°. In accordance with this aspect it is proposed to sweep a notch filter into the direction of the angle of arrival (AoA) of the strongest multipath components. At the AoA of the strongest MPC this MPC will be notched out and suppressed in the order of tens of dBs. Comparing the full CIR with the one where the strongest MPC has been notched allows the processing apparatus to estimate the incident angle of this MPC. It is also possible to estimate even the incident amplitude as well as the incident phase and/or path delay. After subtracting the respective MPC iteratively the next strongest MPCs can be estimated step by step.

A benefit of this approach is that the estimation problem is reduced to single or at least very few, e.g. two or three, MPCs. Due to the iterative approach the complexity grows with the order of N i.e. O(N) where N is the number of relevant MPCs.

Figure 10:
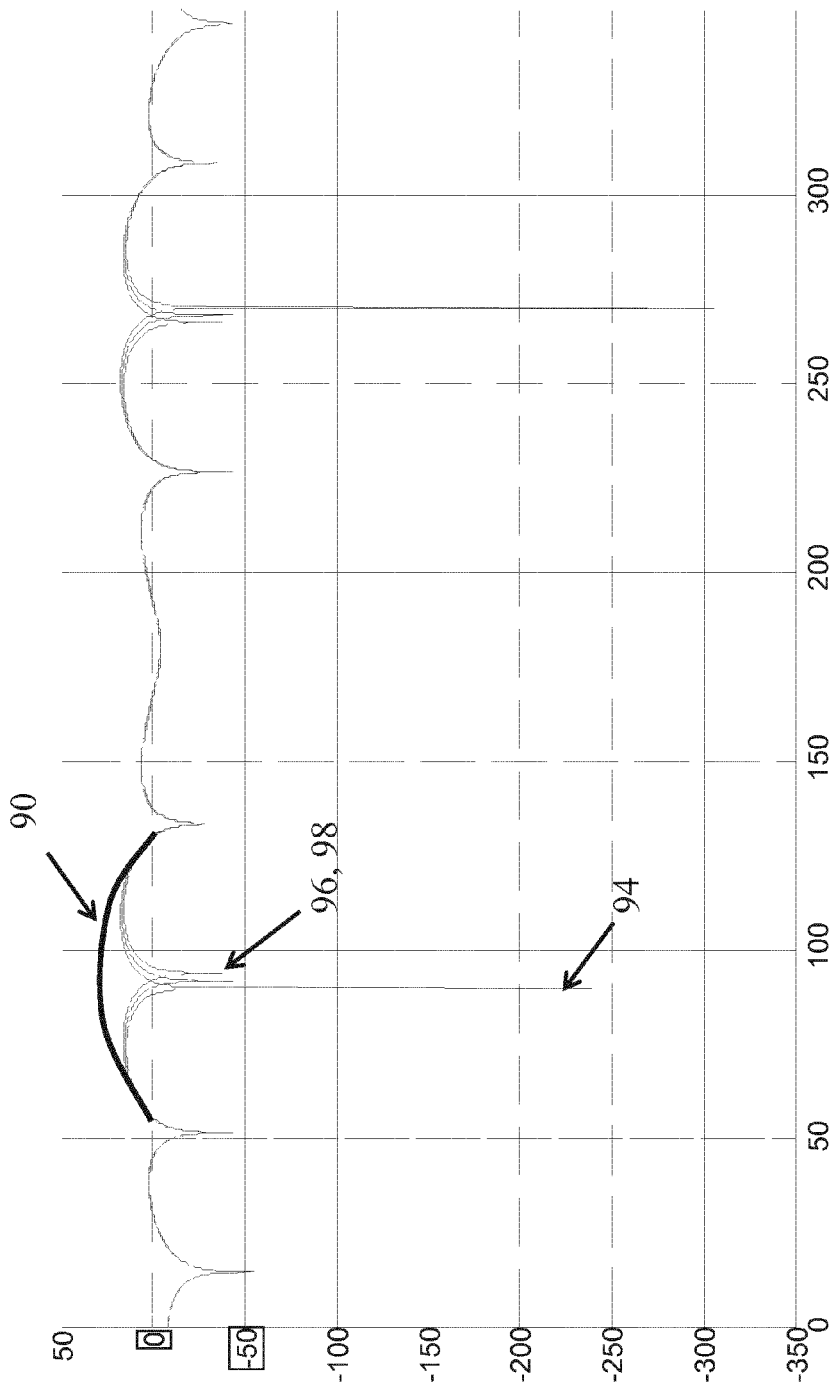

In accordance with an embodiment the virtual beamforming approach described above is combined with the notch filter approach. In a beamformer signals from different locations need to be combined. The virtual beamformers can be assumed as basic virtual antennas. By combining four virtual beams formed over 24 locations by a relative location shift of one location to each other the resulting combined beamformer can be as shown in FIG. 10 showing virtual Beam Pattern with varying notch filtering in [dB] over 180 degrees range. The original beamformer is also shown by the arc line 90. This line indicates the original beamforming pattern without notch filtering. A notched beamformer is shown for three different notch angles of 94, 96 and 98 degrees (these are dedicated with references 94, 96 and 98). The Figure illustrates the sharp resolution provided by the notch filter approach. Combining of the four virtual beamformers seems to be a good choice as it generates mainly one sharp notch (94) for the given configuration.

Figure 11:
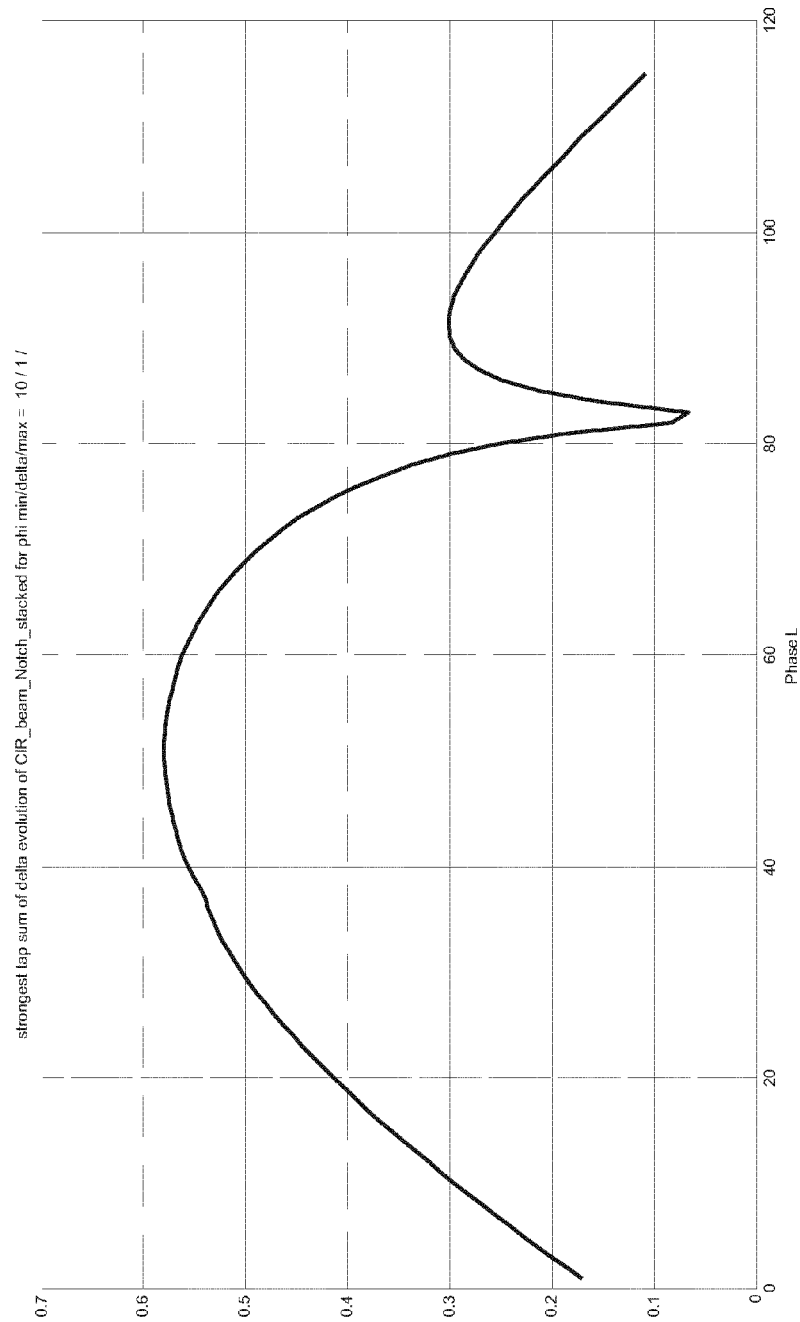

For evaluation the notch filter was swept over the main beam lobe angle as illustrated in FIG. 11 for a measured CIR from a LTE testbed in a non-line of sight (NLOS) conditions around 300 m away from the eNB. At the angle of the strongest MPC at around 82 to 83 degree a strong decline of the received power is visible due to the cancellation of the strongest MPC, making an accurate parameter estimation possible by means of further evaluation. By subtracting the corresponding MPC from the original CIR the next strongest MPCs can be detected in a similar manner.

Extension of the virtual beamformer approach by notch filtering can be used to increase selectivity for estimation of the AoA for multi path components by factors to about 1 degree. Application of notch filtering and further processing of the separated multi path components enables estimation of other parameters like amplitude, phase and the evolution of the delay $\tau$ over the locations. The results can be used as accurate input for a fine granular parameter estimation based on conventional techniques like SAGE with a significantly reduced search space.

A benefit of the virtual beamforming and/or the notched filtering is the possibility of a much more accurate and decoupled estimation of the multipath components of typical macro cellular radio channel impulse responses. Beside a high accuracy complexity of the channel estimation and prediction can be decreased as the parameter estimation can be parallelised, i.e. is increasing just with O(N) of number of relevant multi path components.

The above discussed aspects can be combined with use of increased measurement bandwidth. In the increased bandwidth technique a coordinated set of reference symbols can be configured for a multiple of carriers for enabling coherent transmission of the reference symbols. The coordination facilitates a common channel estimation procedure for the multiple of carriers on bandwidth extending over the multiple of carriers. To provide coordinated transmission of the reference symbols on a multiple of carriers each providing a frequency resource the bandwidth for the estimation is extended from covering one frequency resource to cover at least the entire frequency resources used by the multiple of carriers. For example, in case of carrier aggregation component carriers the measurement bandwidth is increased from the bandwidth of a single component carrier to the bandwidth of a multiple of component carries. For example, the bandwidth can be increased from a 20 MHz bandwidth of a single frequency band to a 100 MHz bandwidth. An eNB or another controlling entity can ensure the possibility to use e.g. wideband reference signals by aligning features such as phase, frequency offset and timing as well as reference signal processes between the available component carriers so that UEs are able to do meaningful wideband measurements.

Switching between one, two or all of the techniques and/or use of the combinations can be provided depending on the scenario. A combination of an enlarged measurement bandwidth together with virtual beamforming can split the high dimensional parameter estimation into a number of parallel lower order and more feasible parameter estimation problems.

Appropriate signalling may be provided for ensuring that base station controllers or eNBs are made aware of the type of information UEs are reporting. Similarly, UEs may be informed whether a eNB transmits virtual beamforming reference signals.

Figure 12:
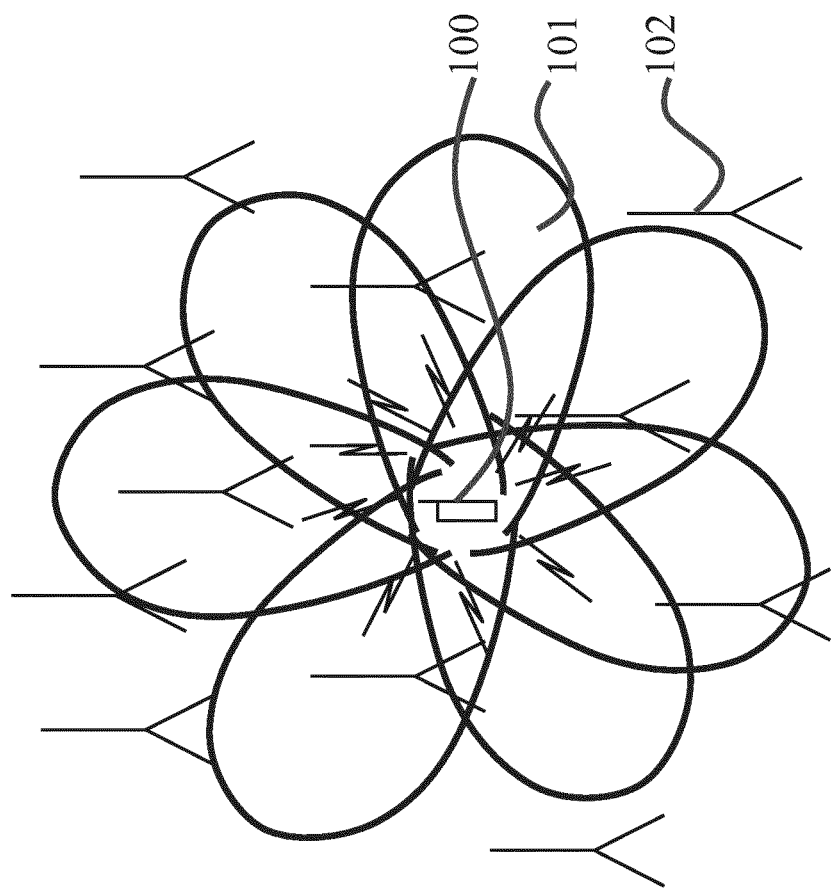
FIG. 12 shows a schematic example of a massive MIMO.

The above described techniques can be applied to, in addition to virtual antennas for moving UEs, also to channel estimation for massive MIMO antennas. In massive MIMOs a high number of physical antennas at known locations are provided. This is schematically illustrated in FIG. 12 showing a mobile device 100 forming a plurality of reception beams 101 for reception on multiple channels from a plurality of antennas 102.

It is noted that instead of a mobile device the communication device may comprise any other radio station where virtual beamforming can be applied to. Non-limiting examples of such devices are an eNB, a relay node, a pico or femto node, machine type terminal and so on.

Appropriate apparatus or means can be provided for controlling a communication device and a network element to provide the various embodiments. The apparatus can comprise means for forming at least two sets of multipath components for a reception range by applying spatial filtering to reference signal information measured by a mobile device, wherein each set of multipath components comprises a number of multipath components that is less than the number of multipath components for the range, and for performing separate parameter estimations on the at least two sets of multipath components. Means can also be provided for forming a virtual multi-antenna array based on a first measurement in a first location and at least one second measurement in at least one second location. The means can form a first set of multipath components in a first directed beamformer and at least one second set of multipath components in at least one second directed beamformer. These beamformers can be applied to all locations.

Means for switching between different modes of channel estimation may also be provided. The switching can be based on the velocity of a mobile communication device. Switching may be to or from a mode where the range is divided into subranges by the spatial filtering based on a velocity threshold. Mobility information for the mode switching may be generated by positioning means of the mobile communication device.

Means for notch filtering may also be provided. The means for notch filtering can apply one or more notches to multipath components.

The required data processing apparatus and functions of a base station apparatus, a communication device and any other appropriate element may be provided by means of one or more data processors or other means arranged to provide the required functions. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that the issues are not limited to any particular communication system, standard, protocol, specification, radios, or link direction and so forth, but may occur in any communication device and/or system where channel estimation may be needed. The various examples above can be provided as alternatives or as complementary solutions. Whilst embodiments have been described in relation to communication system such as those based on the LTE systems and 3GPP based systems and certain current and possible future version thereof, similar principles can be applied to other communication systems. For example, this may be the case in applications where no fixed station equipment is provided but a communication system is provided by means of a plurality of user equipment, for example in ad hoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:
1. A method for channel estimation comprising:
receiving, by a communication device in a wireless network, one or more reference signals,
measuring, by the communication device, reference signal information based on the one or more received reference signals,
forming, by the communication device, at least two sets of multipath components for a reception range by applying spatial filtering to the reference signal information measured by the communication device, wherein the applying the spatial filtering causes each set of multipath components to include a number of multipath components that is less than the number of multipath components for the reception range, generating, by the communication device, a notch filter by combining the at least two sets of multipath components, applying, by the communication device, the notch filter to detect a strongest multipath component in order to perform separate parameter estimations on multipath components of the at least two sets of multipath components.

2. A method according to claim 1, wherein the communication device comprises a mobile device, the method comprising providing a virtual multi-antenna array by performing by the mobile device a first measurement in a first location and at least one second measurement in at least one second location.

3. A method according to claim 1, comprising forming a first set of multipath components by a first directed beamformer and at least one second set of multipath components by at least one second directed beamformer.

4. A method according to claim 1, comprising varying the spatial filtering to rotate a reception beam of the communication device over a 360 degrees range.

5. A method according to claim 1, comprising combining the results of the separate parameter estimations to produce channel state information for the communication device.

6. A method according to claim 1, wherein the communication device comprises a mobile device, the method comprising switching between different modes of channel estimation based on the velocity of a the mobile device.

7. A method according to claim 6, comprising switching to or from a mode where the range is divided into subranges by the spatial filtering based on a velocity threshold.

8. A method according to claim 1, comprising communicating information between the communication device and a network entity concerning the manner channel state information is produced.

9. A method according to claim 1, comprising comparing a full channel impulse response with a channel impulse response where the strongest multipath component has been notched out and estimating at least one parameter based on the comparison.

10. A method according to claim 9, wherein the at least one parameter comprises at least one of angle of arrival of the multipath component, incident amplitude, incident phase and path delay.

11. An apparatus for channel estimation, the apparatus comprising at least one processor, and at least one memory including computer program code, wherein the at least one memory and the computer program code are configured to, with the at least one processor, cause the apparatus at least to:

receive, by a communication device in a wireless network, one or more reference signals, measure, by the communication device, reference signal information based on the one or more received reference signals, form, by the communication device, at least two sets of multipath components for a reception range by applying spatial filtering to the reference signal information measured by the communication device, wherein the applying the spatial filtering causes each set of multipath components to include a number of multipath components that is less than the number of multipath components for the reception range, generate, by the communication device, a notch filter by combining the at least two sets of multipath components, and apply, by the communication device, the notch filter to detect a strongest multipath component in order to perform separate parameter estimations on multipath components of the at least two sets of multipath components.

12. An apparatus according to claim 11, wherein the apparatus is configured to combine the results of the separate parameter estimations to produce channel state information for the communication device.

13. An apparatus according to claim 11, the apparatus being configured to form a virtual multi-antenna array based on a first measurement in a first location by a mobile device and at least one second measurement in at least one second location by the mobile device, and/or a first set of multipath components by a first directed beamformer and at least one second set of multipath components by at least one second directed beamformer.

14. A non-transitory computer-readable storage medium comprising instructions stored thereon for managing a server template that, when executed by at least one processor, are configured to cause at least one computing system to perform the steps of claim 1.

15. The method of claim 1 and further comprising:

determining, by the communication device, channel state information for the communication device based on the parameter estimations on the multipath components, and reporting, by the communication device, the channel state information for the communication device to a base station or other network node.

* * * * *

UNITED STATES PATENT AND TRADEMARK OFFICE
CERTIFICATE OF CORRECTION

| | |
|---|---|
| PATENT NO. | : 9,819,516 B2 |
| APPLICATION NO. | : 14/780408 |
| DATED | : November 14, 2017 |
| INVENTOR(S) | : Wolfgang Zirwas |

Page 1 of 1

It is certified that error appears in the above-identified patent and that said Letters Patent is hereby corrected as shown below:

In the Claims

In Column 15, Lines 4-5, Claim 1, delete "components," and insert -- components, and --, therefor.

In Column 15, Line 31, Claim 6, delete "of a the" and insert -- of a --, therefor.

In Column 16, Lines 28-29, Claim 13, delete "11, the apparatus being" and insert -- 11, wherein the apparatus is --, therefor.

In Column 16, Line 41, Claim 15, delete "1 and" and insert -- 1, --, therefor.

Signed and Sealed this
Thirteenth Day of February, 2018

Andrei Iancu
*Director of the United States Patent and Trademark Office*